United States Patent
Choi et al.

(10) Patent No.: US 8,246,743 B2
(45) Date of Patent: Aug. 21, 2012

(54) SINGLE CRYSTAL SILICON CARBIDE NANOWIRE, METHOD OF PREPARATION THEREOF, AND FILTER COMPRISING THE SAME

(75) Inventors: Sung-Churl Choi, Seoul (KR); Sang-Hoon Lee, Seoul (KR); Jin-Seok Lee, Seoul (KR); Yun-Ki Byeun, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 1218 days.

(21) Appl. No.: 11/919,809

(22) PCT Filed: Aug. 16, 2007

(86) PCT No.: PCT/KR2007/003921
§ 371 (c)(1),
(2), (4) Date: Feb. 21, 2008

(87) PCT Pub. No.: WO2008/018782
PCT Pub. Date: Feb. 14, 2008

(65) Prior Publication Data
US 2010/0293910 A1    Nov. 25, 2010

(51) Int. Cl.
*C30B 1/00* (2006.01)
(52) U.S. Cl. .................................. 117/7; 117/4; 117/951
(58) Field of Classification Search .................. 117/6, 7, 117/4, 951
See application file for complete search history.

(56) References Cited

U.S. PATENT DOCUMENTS 4,946,808 A * 8/1990 Wei et al. ..................... 501/95.3
5,643,843 A * 7/1997 Dunmead et al. ............... 501/92

FOREIGN PATENT DOCUMENTS

KR    10-2006-0021580    3/2006
WO    WO 03024892 A1 *  3/2003

OTHER PUBLICATIONS

Jayaseelan et al, "In Situ Formation of Silicon Carbide Nanofibers on Cordierite Substrates", J. Am. Ceram. Soc., 90 [5] 1603-1606 (2007).*
Zhu et al "In Situ Growth of B-SiC Nanowires in Porous SiC Ceramics", J. Am. Ceram. Soc. 88 [9] p. 26-19-2621 (2005).*
Korean Patent Abstracts, Publication No. 1020060021580, dated Mar. 8, 2006, in the name of Ki Jung Yong et al.
Lieber, C.M., et al., *Synthesis and characterization of carbide nanorods*, Nature, vol. 375, Jun. 29, 1995, pp. 769-772.
Iijima, S., *Helical microtubules of graphitic carbon*, Nature, vol. 354, Nov. 7, 1991, pp. 56-58.
Dal et al., *Synthesis and characterization of carbide nanorods*, Nature, vol. 375, Jun. 29, 1995, pp. 769-772.

* cited by examiner

*Primary Examiner* — Matthew Song
(74) *Attorney, Agent, or Firm* — Christie, Parker & Hale, LLP

(57) ABSTRACT

Single-crystal silicon carbide nanowires and a method for producing the nanowires are provided. The single-crystal silicon carbide nanowires have a very high aspect ratio and can be used for the fabrication of nanoelectronic devices, including electron gun emitters and MEMS probe tips, for use in a variety of displays and analyzers. Further provided is a filter comprising the nanowires. The filter is applied to systems for filtering vehicle engine exhaust gases to achieve improved filtering performance and increased lifetime.

9 Claims, 7 Drawing Sheets
(6 of 7 Drawing Sheet(s) Filed in Color)

(a)　　　　　　　　　(b)

Fig. 10
(a)
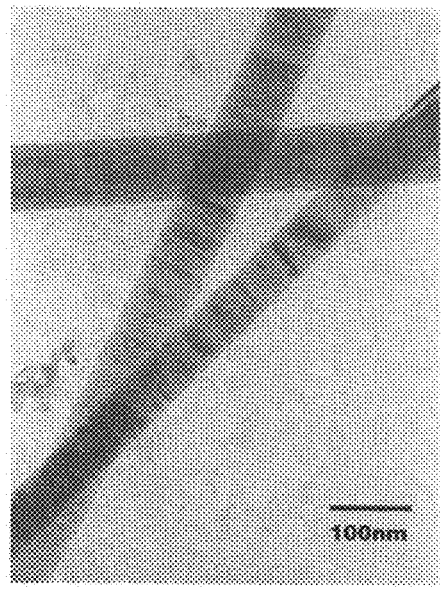
(b)
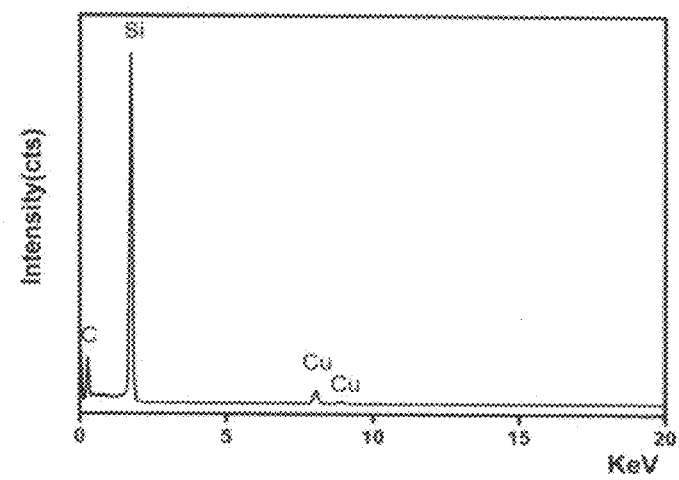

SINGLE CRYSTAL SILICON CARBIDE NANOWIRE, METHOD OF PREPARATION THEREOF, AND FILTER COMPRISING THE SAME

CROSS-REFERENCE TO RELATED APPLICATION

This application is a National Phase Patent Application of International Application Number PCT/KR2007/003921, filed on Aug. 16, 2007.

TECHNICAL FIELD

The present invention relates to single-crystal silicon carbide nanowires, a method for producing the nanowires, and a filter comprising the nanowires. More specifically, the present invention relates to single-crystal silicon carbide nanowires that can be used for the fabrication of nanoelectronic devices, a method for producing the nanowires, and a filter comprising the nanowires that is applicable to systems for filtering vehicle engine exhaust gases.

BACKGROUND ART

Silicon carbide has attracted many researchers' interest around the world due to its remarkable chemical, mechanical and field emission properties. For example, silicon carbide is currently used as a base material for diesel engine exhaust filters and is a representative material for high-strength, high-toughness structures. Under such circumstances, the amount of money being spent to manufacture silicon carbide-related products is steadily increasing year after year, suggesting that silicon carbide is considered to be worthy of research and to be of commercial value.

Silicon carbide has been produced and used in a bulk or thin film form.

Silicon carbide on a nanometer scale has high specific surface area and high strength per unit area unachievable by bulk silicon carbide. When nanometer-sized silicon carbide is applied to electronic devices, they can show excellent characteristics, such as field emission effects and quantum confinement effects, which are those inherent to nanowires.

Since a Japanese research group led by S. Iijima has first reported on carbon nanotubes in 1991 (S. Iijima, *Nature*, 1991), numerous studies have been conducted on one-dimensional nanostructures (e.g., nanowires) throughout the world.

C. M. Lieber research group, Harvard University, presented the first report on silicon carbide nanostructures in 1995 (C. M. Lieber, *Nature*, 1995). Specifically, the research group reported methods for the synthesis of silicon carbide nanowires using carbon nanotubes. Since then, a great deal of research and development aimed at the synthesis of silicon carbide nanowires has been conducted to date.

Korean Patent Application No. 2004-70373 suggests a method for the production of silicon carbide nanowires coated with high-purity, high-density carbon by dissolving nickel nitrite hexahydrate as a catalyst in an alcohol, applying the catalyst solution to a silicon substrate, putting the catalyst-coated silicon substrate and a mixture of a tungsten oxide powder and a carbon powder in a sapphire boat, heating the sapphire boat while feeding an inert gas into the sapphire boat, and cooling the heated sapphire boat to room temperature.

According to the method, however, amorphous films, oxide films or particles remain adsorbed on the surfaces of silicon carbide nanowires and the metal used as catalyst is left behind, resulting in a deterioration in the physical properties of the silicon carbide nanowires.

Only a few of the reported technologies associated with the synthesis of silicon carbide nanowires have been successful in the fabrication of devices using silicon carbide nanowires. Current research is applied at the laboratory level and more research is still needed.

Further, since most of the technologies are associated with the fabrication of semiconductor devices, actual difficulties exist in the application to a series of semiconductor manufacturing processes due to high growth temperatures of silicon carbide. Moreover, the use of highly priced apparatuses for the growth of silicon carbide makes a commercial approach to the fabrication of semiconductor devices difficult.

Furthermore, the use of expensive silica with a purity as high as 99.9% as a raw material for silicon carbide and an additional crystallization catalyst renders the production procedure complex and causes a marked increase in production cost.

In conclusion, silicon carbide nanowires have not yet been put to practical use in many applications despite their excellent physical properties.

DISCLOSURE

Technical Problem

Thus, it is one object of the present invention to provide single-crystal silicon carbide nanowires free of impurities and having a high aspect ratio.

It is another object of the present invention to provide a method for mass producing the single-crystal silicon carbide nanowires.

It is another object of the present invention to provide a filter comprising the single-crystal silicon carbide nanowires grown therein.

It is still another object of the present invention to provide a method for manufacturing the filter.

Technical Solution

In accordance with one aspect of the present invention for achieving the above objects, there is provided a method for producing single-crystal silicon carbide nanowires, the method comprising the steps of mixing silica with carbon, pressing the mixture to form a porous support, and crystallizing the porous support under an inert atmosphere.

Silicon carbide nanowires produced by the method of the present invention are high-quality single-crystal nanowires that contain no amorphous film or oxide film on the outer surfaces thereof and have an aspect ratio of 0.0005:1 to 0.05:1.

In accordance with another aspect of the present invention, there is provided a filter comprising the single-crystal silicon carbide nanowires.

Specifically, the filter of the present invention is manufactured by mixing silica with carbon, pressing the mixture to form a porous support, positioning the porous support on or under a filter base, and crystallizing the resulting structure under an inert atmosphere to grow single-crystal silicon carbide nanowires through cells of the filter base.

Advantageous Effects

According to the present invention, a low-grade raw material is used to produce high value-added single-crystal silicon carbide nanowires and manufacture a filter comprising the nanowires. The single-crystal silicon carbide nanowires can be used for the fabrication of nanoelectronic devices, including electron gun emitters and MEMS probe tips, for use in a variety of displays and analyzers. The filter is applied to systems for filtering vehicle engine exhaust gases to achieve improved filtering performance and increased lifetime.

DESCRIPTION OF DRAWINGS

The patent or application file contains at least one drawing executed in color. Copies of this patent or patent application publication with color drawing(s) will be provided by the Office upon request and payment of the necessary fee.

FIG. 9a is a transmission electron microscopy image (×100 k magnification) of a tip portion of a single-crystal silicon carbide nanowire, and FIG. 9b is a graph showing the analytical results of energy dispersive X-ray spectroscopy (EDS) for the tip portion of FIG. 9a.

FIG. 10a is a transmission electron microscopy image (×100 k magnification) of core portions of single-crystal silicon carbide nanowires produced in Example 1, and FIG. 10b is a graph showing the analytical results of energy dispersive X-ray spectroscopy (EDS) for the core portions shown in FIG. 10a.

BEST MODE

Figure 1:
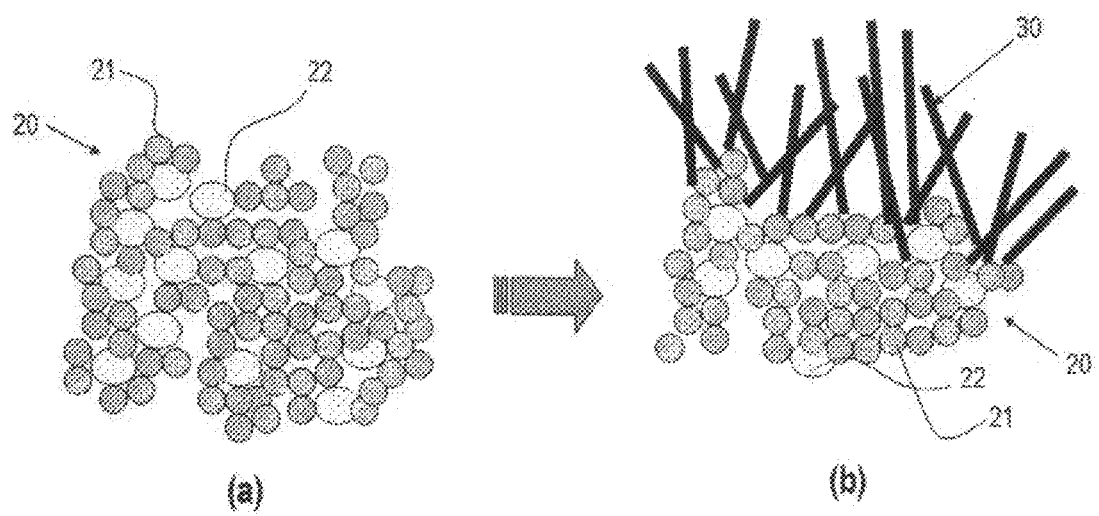
FIGS. 1a and 1b are diagrams illustrating a mechanism in which low-grade silica reacts with carbon within a porous support to grow single-crystal silicon carbide into nanowires in accordance with the present invention.

Hereinafter, preferred embodiments of the present invention will be described in more detail.

The present invention provides a method for producing single-crystal silicon carbide nanowires, the method comprising the steps of mixing silica with carbon, pressing the mixture to form a porous support, and crystallizing the porous support under an inert atmosphere.

According to the production method of the present invention, high-quality single-crystal silicon carbide nanowires can be produced using an inexpensive low-grade raw material as a starting material. Single-crystal silicon carbide nanowires produced by the method of the present invention can be used for the fabrication of nanoelectronic devices, including electron gun emitters and microelectromechanical system (MEMS) probe tips, for use in a variety of displays and for analytical applications. Single-crystal silicon carbide nanowires produced by the method of the present invention can be grown within a variety of filter bases to manufacture filters. The filters thus manufactured can be easily applied to various filter systems, for example, systems for filtering vehicle engine exhaust gases.

Specifically, single-crystal silicon carbide nanowires are produced by the following procedure. First, silica is mixed with carbon using a mixer. At this time, the weight ratio of the silica to the carbon is from 6:1 to 0.5:1 and preferably from 4:1 to 1:1.

The mixing ratio between the silica and the carbon is determined in view of the stoichiometric ratio of the raw materials. If an excess amount of the silica is used, i.e. the amount of the carbon required when the carbon reacts with the silica to form silicon carbide (SiC) is relatively small, a portion of the silica (Si) remains unreacted within pores, making it difficult to achieve sufficient conductivity. Meanwhile, if an excess amount of the carbon is used, a portion of the carbon remains unreacted and deteriorates the formability of the mixture.

Relatively cheap low-grade silica with a purity of 97% or higher is used in the present invention. The low-grade silica contains impurities, such as Fe, at a level of several ppm. Such impurities serve as catalysts for the growth of silicon carbide crystals in the subsequent steps. As a result, the need to use an additional crystallization catalyst of silicon carbide is avoided, thus simplifying the production procedure and markedly lowering the production cost. The impurities are volatilized at high temperatures during crystallization. That is, the production method of the present invention has an advantage in that no impurities are present in the final product.

The carbon can be selected from the group consisting of carbon black (e.g., KETJEN BLACK®), acetylene black (e.g., DENKA BLACK®), and combinations thereof.

It is preferred that the silica and the carbon be in a powder form and have a different distribution in particle diameter from the viewpoint of pore size control. That is, the silica is mixed with the carbon to form a porous support and silicon carbide nanowires are grown through pores present within the porous support. The pore size of the porous support may be changed by varying the particle sizes of the raw materials, which enables the production of silicon carbide nanowires having desirable physical properties.

Specifically, the silica and the carbon are powders that preferably have a particle diameter of 0.01 to 10 μm and more preferably 0.05 to 5 μm. Silica and carbon having a particle diameter smaller than 0.01 μm suffer from difficulty in handling during processing steps, such as weighing and mixing, and are highly densified during crystallization, causing an obstruction of inner pores of the pressed product. Meanwhile, silica and carbon having a particle diameter greater than 10 μm (i.e. a relatively small specific surface area) cause a reduction in the partial pressures of gases formed by the reactions between the silica and the carbon at a crystallization temperature, making it difficult to produce silicon carbide nanowires.

The silica and the carbon may have various shapes, such as rods, plates, needles and spheres, but are not particularly limited to these shapes.

The mixing is performed in a common mixer by a dry or wet mixing process for 5-48 hours and preferably 16-24 hours.

Next, the mixed powder is pressed to form a porous support.

The pressing can be performed by any known technique. For example, the mixed powder is uniaxially pressed under a pressure of 100-500 kg/cm² or isostatically pressed under a pressure of 1,000-4,000 kg/cm² into a plate form.

The pressing allows gases present within the low-grade silica and the carbon black to be released into the atmosphere and leaves pores to form a porous support. Depending on the pressing conditions, the porous support has a porosity of 30-70% and preferably 35-50% and a pore size of 1-10 μm.

Next, the porous support is crystallized under an inert atmosphere to produce single-crystal silicon carbide nanowires.

FIGS. 1a and 1b are diagrams illustrating a mechanism in which low-grade silica 21 reacts with carbon 22 within a porous support 20 to grow single-crystal silicon carbide into nanowires in accordance with the production method of the present invention.

Referring to FIGS. 1a and 1b, the porous support 20 composed of the low-grade silica 21 and the carbon 22 is heated and pressurized during crystallization to be converted to silicon carbide 30, which is then grown into crystals in the form of nanowires.

The silicon carbide nanowires thus grown can be collected in an easy manner. Therefore, the method of the present invention is suitable for mass production of silicon carbide nanowires and enables the commercialization of silicon carbide nanowires.

Taking into consideration the crystal growth and economic efficiency, the crystallization is performed under a pressure of $1 \times 10^{-2}$ to $1 \times 10^{-3}$ ton at 1,300 to 1,600° C. for 10 to 120 minutes. Below 1,300° C., amorphous films are formed and impurities (e.g., Fe) remain on the surfaces of the silicon carbide nanowires. Few or no silicon carbide nanowires are formed for a crystallization time shorter than 10 minutes. A polycrystalline second phase containing large amounts of impurities may be formed under a pressure higher than $1 \times 10^{-2}$ torr.

The inert atmosphere is created by feeding pure argon gas, argon gas containing 10% hydrogen or a mixed gas thereof into a reactor where the silica reacts with the carbon. Preferably, at least one gas selected from the group consisting of 4N or higher argon gas and argon gas containing 10% hydrogen is fed at a flow rate of 0.5-2 standard liters per minute (SLM) into the reactor.

The porous support is converted to silicon carbide (SiC) in the presence of argon gas by the following Reaction Scheme 1:

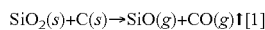
$SiO_2(s)+C(s) \rightarrow SiO(g)+CO(g)\uparrow$ [1]

$SiO_2(s)+3C(s) \leftrightarrows SiC(s)+2CO(g)\uparrow$ [2]

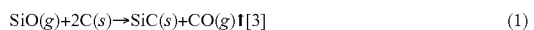
$SiO(g)+2C(s) \rightarrow SiC(s)+CO(g)\uparrow$ [3]     (1)

Referring to Reaction Scheme 1, silica ($SiO_2$) and carbon (C) as starting materials react with each other to form silicon monoxide (SiO) in a gas phase (Reaction [1]), silica reacts with carbon through crystallization to form silicon carbide (SiC) (Reaction [2]), and the silicon monoxide formed in Reaction [1] reacts with carbon to form silicon carbide (Reaction [3]). The carbon content and the reaction temperatures affect Reactions [1] and [2]. When argon gas containing hydrogen is fed into the reactor, the porous support is converted to silicon carbide (SiC) by the following Reaction Scheme 2:

$SiO_2(s)+C(s) \rightarrow SiO(g)+CO(g)\uparrow$ [1]

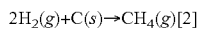
$2H_2(g)+C(s) \rightarrow CH_4(g)$ [2]

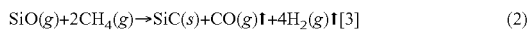
$SiO(g)+2CH_4(g) \rightarrow SiC(s)+CO(g)\uparrow+4H_2(g)\uparrow$ [3]     (2)

Referring to Reaction Scheme 2, silica reacts with carbon to yield silicon monoxide (Reaction [1]), hydrogen contained in the argon gas is converted to methane gas (Reaction [2]), and the silicon monoxide formed in Reaction [1] reacts with the methane gas through crystallization to form silicon carbide (Reaction [3]).

The silicon carbide nanowires produced through the reaction steps are single crystalline, highly pure and highly dense. The silicon carbide nanowires are high-quality nanowires that contain no impurity particles, amorphous films or oxide films on the outer and inner surfaces thereof, unlike conventional known silicon carbide nanowires.

The silicon carbide nanowires have a diameter in the nanometer range and a length in the micrometer range, representing that the silicon carbide nanowires have an aspect ratio of 0.0005:1 to 0.05:1. This high aspect ratio is closely associated with the application of the silicon carbide nanowires. Specifically, the single-crystal silicon carbide nanowires of the present invention have a diameter of 5 to 50 nm and a length of 1 to 200 μm, preferably, have a diameter of 20 to 50 nm and a length of 5 to 200 μm.

Particularly, according to the method of the present invention, inexpensive low-grade silica is used and impurities (e.g., Fe) contained in the silica act as natural catalysts without the need to use any special catalyst to produce single-crystal silicon carbide nanowires. Therefore, the method of the present invention can be preferably applied to mass production of single-crystal silicon carbide nanowires and provides significant advantages in terms of processing and cost over conventional methods using expensive high-purity silica as a catalyst.

Single-crystal silicon carbide nanowires produced by the method are effectively used for the fabrication of nanoelectronic devices, including electron gun emitters and MEMS probe tips, for use in displays (e.g., field emission displays (FEDs)) and analyzers.

The production method of the present invention may be carried out by appropriately varying the apparatuses used.

According to the production method of the present invention, silicon carbide nanowires may be grown into crystals on the surfaces of various kinds of articles and undergo surface treatment. Alternatively, silicon carbide nanowires produced by the method of the present invention may be grown into crystals within various kinds of articles.

As a representative example, single-crystal silicon carbide nanowires produced by the method of the present invention are grown through cells of a filter base having a predetermined structure. The resulting filter structure can be used for a variety of purposes.

The present invention also provides a filter comprising single-crystal silicon carbide nanowires grown therein. The filter of the present invention is manufactured by mixing silica with carbon, pressing the mixture to form a porous support, positioning the porous support on or under a filter base having a honeycomb structure, and crystallizing the resulting structure under an inert atmosphere to grow single-crystal silicon carbide nanowires through cells of the filter base.

The processing conditions in each step are the same as mentioned above.

It is preferable that the filter have a high porosity and a pore size sufficient to allow single-crystal silicon carbide to grow therethrough. The filter may have various shapes.

Figure 2:
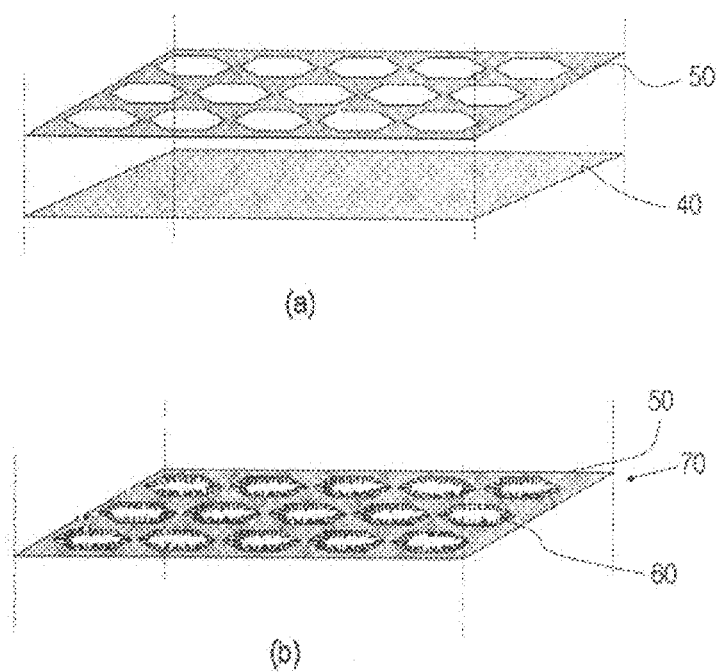
FIGS. 2a and 2b are diagrams illustrating the growth of a porous support into single-crystal silicon carbide through cells of a honeycomb filter base in accordance with the present invention.

FIGS. 2a and 2b are diagrams illustrating the growth of a porous support 40 into single-crystal silicon carbide through cells of a filter base 50 in accordance with the present invention. To assist the understanding of the present invention, a filter base having a honeycomb structure is shown in FIGS. 2a and 2b. The structure of the filter base may be modified in various forms without limitation by those skilled in the art.

Referring to FIGS. 2a and 2b, the porous support 40 composed of low-grade silica and carbon is positioned under the honeycomb filter base 50 and is heated and pressurized during crystallization to be converted to silicon carbide 60, which is then grown into crystals in the form of nanowires.

The filter of the present invention can be used in various fields. For example, the filter of the present invention is applied to systems for filtering vehicle engine exhaust gases to achieve improved filtering performance and increased lifetime.

MODE FOR INVENTION

Hereinafter, preferred embodiments are provided to assist in a further understanding of the invention. The following examples serve to provide further appreciation of the invention but are not meant in any way to restrict the scope of the invention.

EXAMPLES

Example 1

Production of Single-Crystal Silicon Carbide Nanowires

Figure 3:
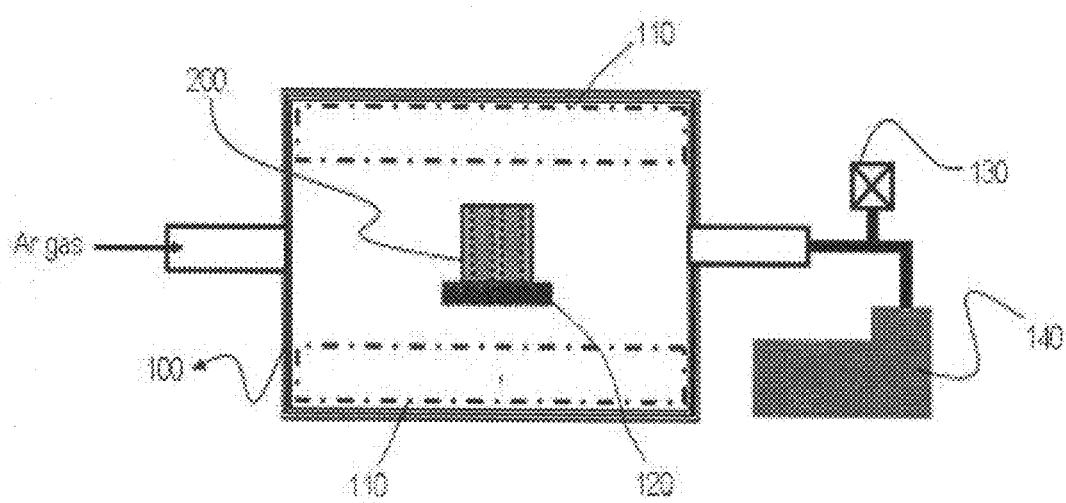
FIG. 3 is a schematic diagram of a crystallization system used in Example 1.

A silica powder (purity: 97%, particle diameter: 0.1 μm) and carbon black (0.5 μm) were introduced into a ball mill and mixed together for 24 hours to obtain a mixed powder. At this time, the weight ratio of the silica powder to the carbon black was adjusted to 3:1. The mixed powder was uniaxially pressed under a pressure of 250 kg/cm$^2$ to form a porous support in the form of a plate. The porous support had a porosity of 35% and a pore size of 5-7 μm. The porous support was subjected to crystallization to produce single-crystal silicon carbide nanowires having a diameter of 50 nm and a length of 100 μm. Specifically, the crystallization was performed using the system shown in FIG. 3. The crystallization system includes a vacuum chamber 100, a temperature and pressure gauge 130 and a pump 140. The vacuum chamber 100 is provided with carbon heaters 110 at its upper and lower portions and a tray at its center. The mixed powder 200 was placed on the tray 120. After argon gas was introduced into the vacuum chamber 110 at a flow rate of 1 SML with heating, the mixed powder was crystallized at a pressure of $4 \times 10^{-2}$ torr and a temperature of 1,400° C. for 60 minutes to produce single-crystal silicon carbide nanowires.

Experimental Example 1

Morphological Analysis (SEM-EDS)

The morphology of the single-crystal silicon carbide nanowires produced in Example 1 was identified by scanning electron microscopy (SEM). The results are shown in FIGS. 4a and 4b.

Figure 4:
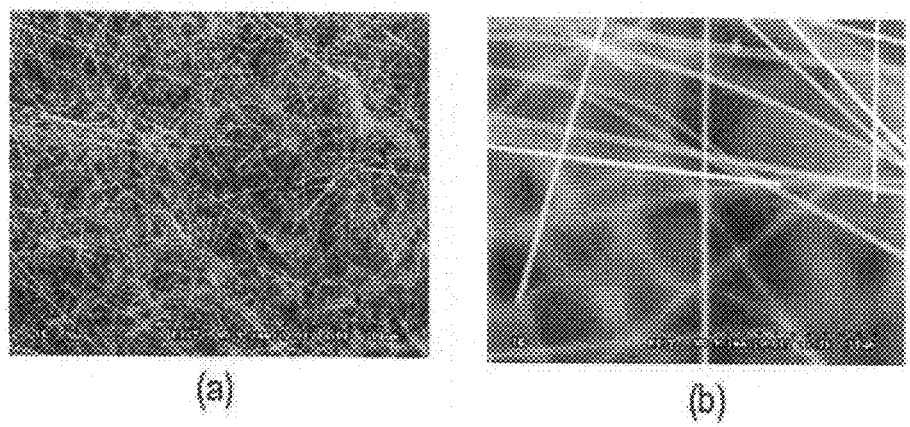
FIGS. 4a and 4b are scanning electron microscopy images of single-crystal silicon carbide nanowires produced in Example 1 at magnifications of 500× and 5 k x, respectively.

FIGS. 4a and 4b are scanning electron microscopy images of the single-crystal silicon carbide nanowires at magnifications of 500× and 5 k ×, respectively.

The images of FIGS. 4a and 4b indicate that the single-crystal silicon carbide nanowires were linearly grown.

Experimental Example 2

Elemental Analysis (EDS)

The elemental analysis of the single-crystal silicon carbide nanowires produced in Example 1 was conducted by energy dispersive X-ray spectroscopy (EDS). The results are shown in FIG. 5.

Figure 5:
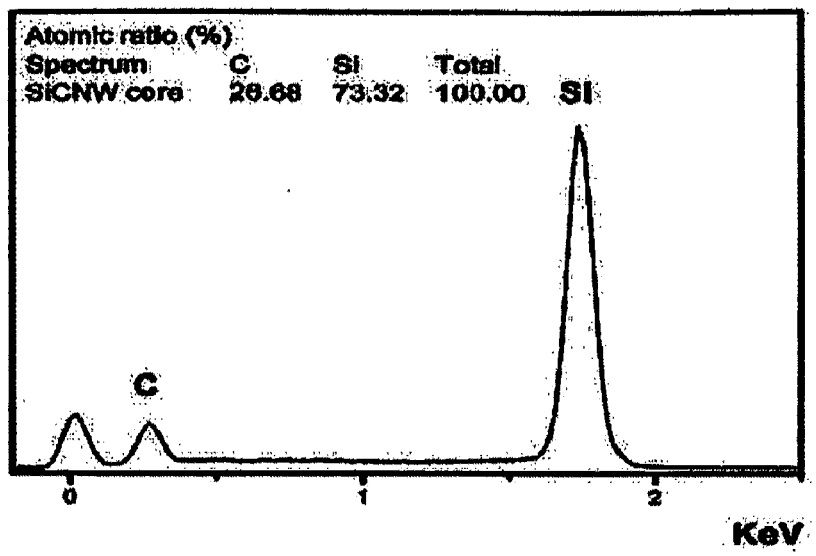
FIG. 5 is a graph showing the results of X-ray microanalysis for single-crystal silicon carbide nanowires produced in Example 1.

FIG. 5 is a graph showing the results of the X-ray microanalysis. The graph of FIG. 5 reveals that the single-crystal silicon carbide nanowires were composed of carbon and silica only.

Experimental Example 3

Crystal Structure Analysis (XRD)

Figure 6:
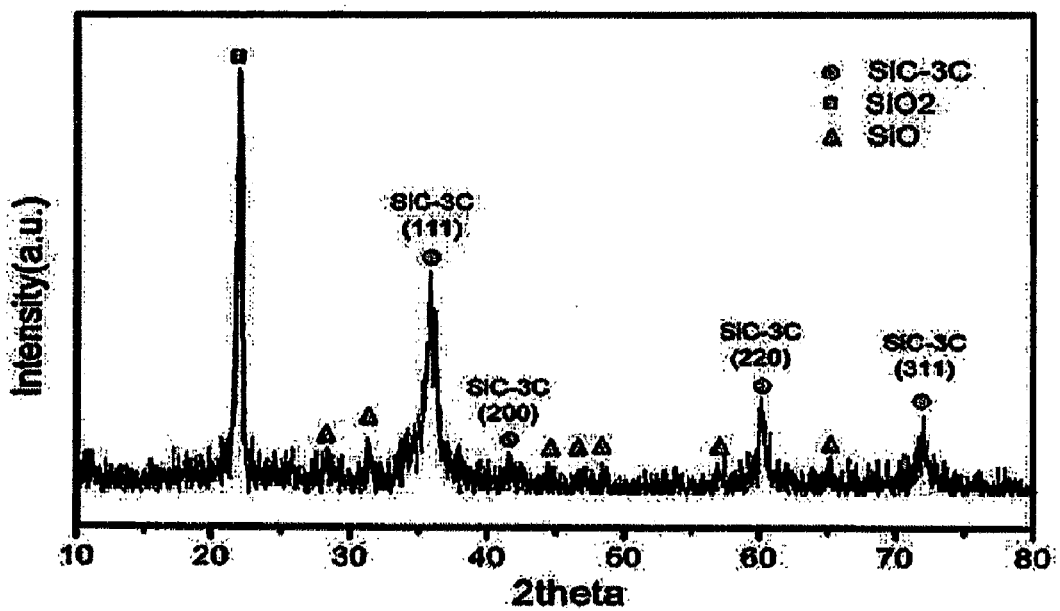
FIG. 6 is a graph showing the results of X-ray diffraction analysis for single-crystal silicon carbide nanowires produced in Example 1.

The crystal structure of the single-crystal silicon carbide nanowires produced in Example 1 was analyzed by X-ray diffraction (XRD) spectroscopy. The results are shown in FIG. 6. FIG. 6 is a graph showing the results of the X-ray diffraction analysis. The graph of FIG. 6 reveals that the single-crystal silicon carbide nanowires were composed of carbon and silica only. In addition, peaks representing the SiC-3C (β-SiC) crystal structure were observed in FIG. 6, indicating that the single-crystal silicon carbide nanowires were grown into high-density single crystals.

Experimental Example 4

Analysis of Impurities (HRTEM)

Figure 7:
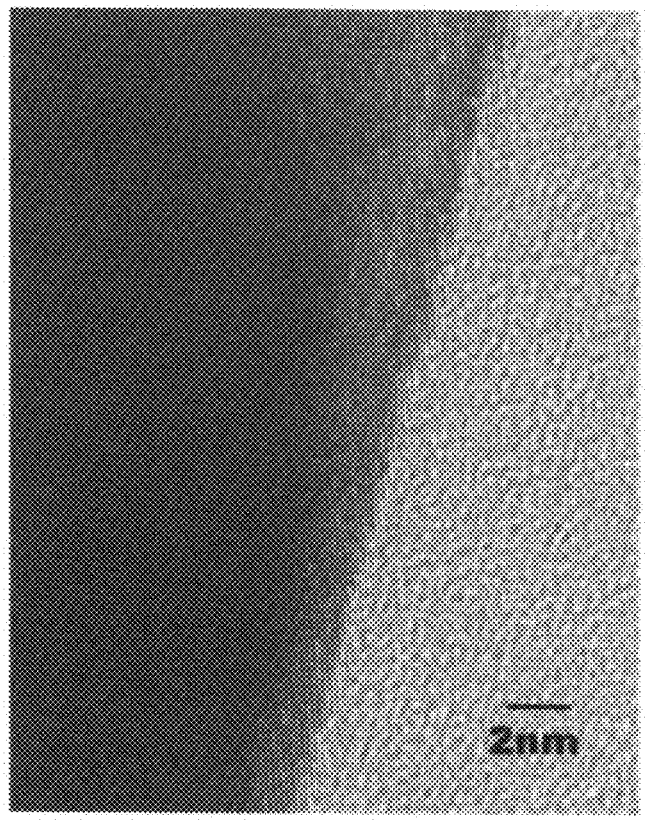
FIG. 7 is a high-resolution transmission electron microscopy image (×500 k magnification) of single-crystal silicon carbide nanowires produced in Example 1.

High-resolution transmission electron microscopy (HR-TEM) was performed to detect impurities contained in the single-crystal silicon carbide nanowires produced in Example 1. The results are shown in FIG. 7. FIG. 7 is a high-resolution transmission electron microscopy image (×500 k magnification) of the single-crystal silicon carbide nanowires. The image of FIG. 7 shows that no stacking fault was formed in the nanowires and no impurities (e.g., amorphous silicon oxide) were present on the surfaces of the nanowires, indicating that the nanowires were grown with high purity.

Experimental Example 5

Single-crystal Structure Analysis (SAD)

Figure 8:
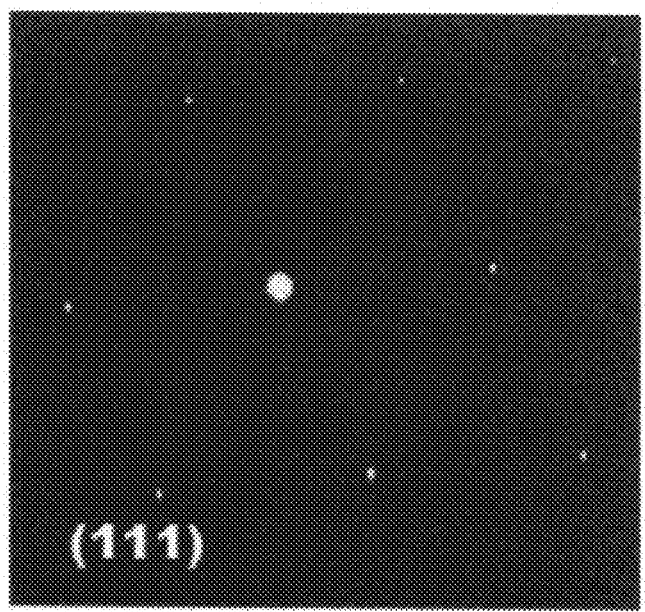
FIG. 8 shows a selected area diffraction (SAD) pattern measured in the zone axis (011) of single-crystal silicon carbide nanowires produced in Example 1.

The single-crystal structure of the single-crystal silicon carbide nanowires produced in Example 1 was confirmed by selective area diffraction (SAD) analysis. The results are shown in FIG. 8. FIG. 8 shows a selected area diffraction (SAD) pattern measured in the zone axis (011) of the single-crystal silicon carbide nanowires. The image of FIG. 8 indicates that the single-crystal silicon carbide nanowires were grown into single crystals in the (111) direction.

Experimental Example 6

Identification of Natural Catalyst (TEM/EDS)

Figure 9:
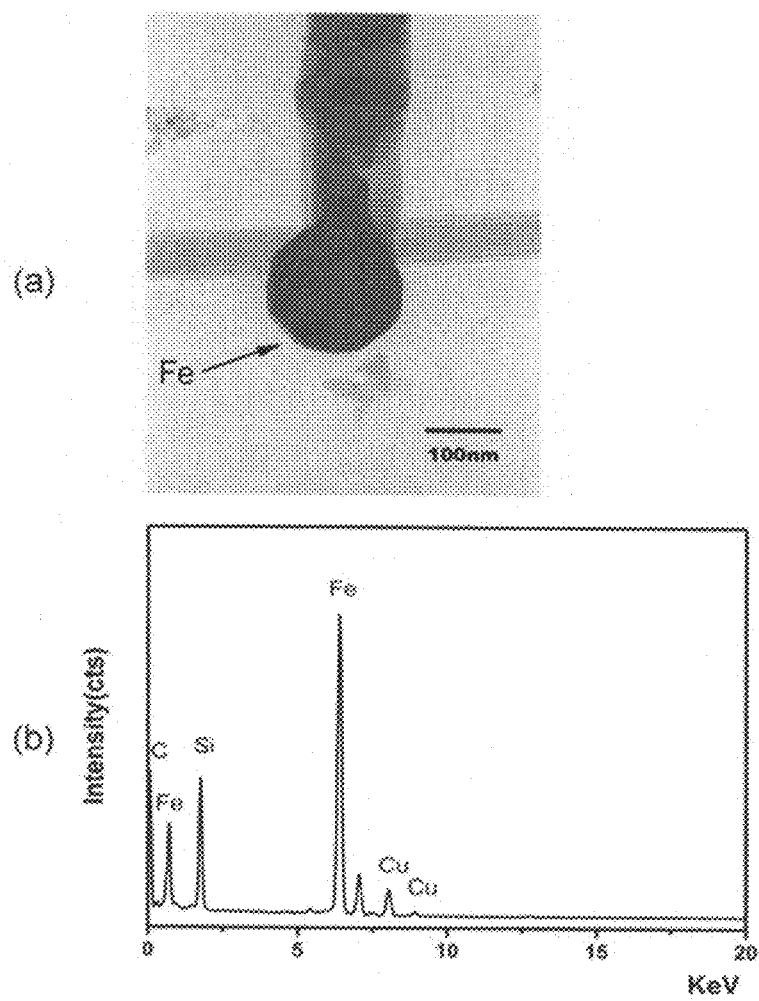
Figure 11:
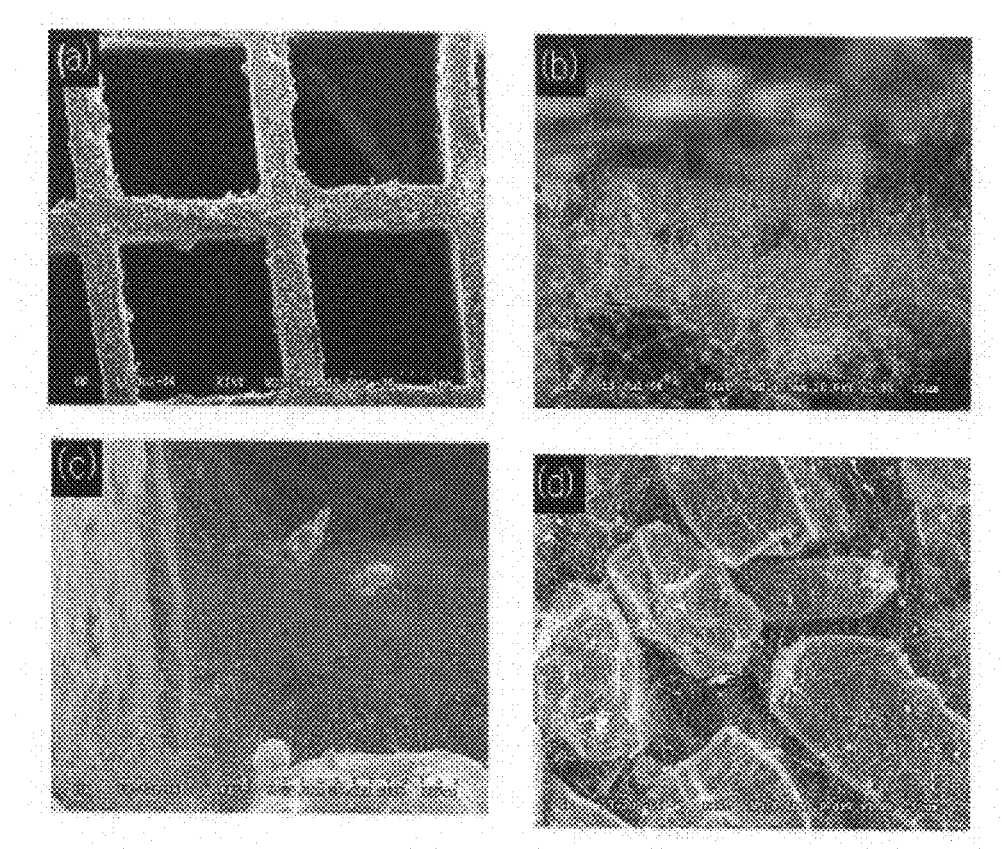
FIGS. 11a, 11b, 11c and 11d are scanning electron microscopy images of a honeycomb filter manufactured in Example 2 at magnifications of 30×, 2 k×, 500× and 1 k×, respectively.

The presence of Fe acting as a natural catalyst in the silicon carbide nanowires produced in Example 1 and the shape of a catalyst layer were examined by transmission electron microscopy and energy dispersive X-ray spectroscopy (EDS), respectively. FIG. 9a is a transmission electron microscopy image (×100 k magnification) of a tip portion of one of the single-crystal silicon carbide nanowires, and FIG. 9b is a graph showing the analytical results of EDS for the tip portion of FIG. 9a. A spherical metal catalyst was formed at the tip portion of the single-crystal silicon carbide nanowire, as indicated by the arrow of FIG. 9a. The elemental analysis of the tip portion was conducted by EDS. As a result, the presence of Fe was identified as shown in FIG. 9b. FIG. 10a is a transmission electron microscopy image (×100 k magnification) of core portions of the single-crystal silicon carbide nanowires, and FIG. 10b is a graph showing the analytical results of energy dispersive X-ray spectroscopy (EDS) for the core portions shown in FIG. 10a. The image of FIG. 10a shows that Fe observed in FIG. 9a disappeared, and the graph of FIG. 10b shows that the single-crystal silicon carbide nanowires were composed of pure silicon carbide only. These results lead to the conclusion that impurities, such as Fe, contained in the low-grade silica act as natural catalysts to aid in growing the single-crystal silicon carbide nanowires.

Example 2

Manufacture of Honeycomb Filter Comprising Silicon Carbide Nanowires were Grown Therein A silica powder (purity: 97%, particle diameter: 0.1 μm) and carbon black (0.5 μm) were introduced into a ball mill and mixed together for 24 hours to obtain a mixed powder. At this time, the weight ratio of the silica powder to the carbon black was adjusted to 3:1. The mixed powder was uniaxially pressed under a pressure of 250 kg/cm$^2$ to form a porous support in the form of a plate. The porous support had a porosity of 35% and a pore size of 5-7 μm. The porous support was positioned in a vacuum chamber and a honeycomb filter base was laid thereon. The honeycomb filter base had a porosity of 50% and a pore size of 20 μm. The resulting structure was subjected to crystallization at a pressure of $4\times10^{-2}$ torr and a temperature of 1,400° C. for 60 minutes while introducing argon gas containing 10% hydrogen into the vacuum chamber at a flow rate of 2 SML to grow single-crystal silicon carbide nanowires (diameter: 8 nm, length: 4 μm) through cells of the honeycomb filter base.

Experimental Example 7

Structure Identification (SEM)

A scanning electron microscope (SEM) was used to identify whether single-crystal silicon carbide nanowires were grown through cells of the honeycomb filter base in Example 2. FIGS. 11a, 11b, 11c and 11d are scanning electron microscopy images of the honeycomb filter at magnifications of 30×, 2 kx, 500× and 1 kx, respectively. These images reveal that silicon carbide was grown into single crystals in the form of nanowires through cells of the honeycomb filter base.

INDUSTRIAL APPLICABILITY

As apparent from the above description, the single-crystal silicon carbide nanowires of the present invention can be used for the fabrication of nanoelectronic devices, including electron gun emitters and MEMS probe tips, for use in displays and analyzers. The filter of the present invention can be applied to systems for filtering vehicle engine exhaust gases to achieve improved filtering performance and increased lifetime.

The invention claimed is:

1. A method for producing single-crystal silicon carbide nanowires, the silicon carbide nanowires having a diameter of 20 to 50 nm and a length of 5 to 200 μm, the method comprising:
   mixing silica with carbon to form a mixture;
   pressing the mixture to form a porous support, the porous support having a porosity of 30-70% and a pore size of 1-10 μm; and
   crystallizing the porous support under an inert atmosphere.

2. The method according to claim 1, wherein the silica and the carbon are mixed with each other in a weight ratio of 6:1 to 0.5:1.

3. The method according to claim 1, wherein the silica and the carbon are mixed with each other in a weight ratio of 4:1 to 1:1.

4. The method according to claim 1, wherein the silica is low-grade silica having a purity of 97% or higher.

5. The method according to claim 1, wherein the carbon is selected from the group consisting of carbon black, acetylene black, and combinations thereof.

6. The method according to claim 1, wherein the pressing is performed by uniaxial pressing or isostatic pressing.

7. The method according to claim 1, wherein the inert atmosphere is created by feeding argon gas, argon gas containing 10% hydrogen or a mixed gas thereof.

8. The method according to claim 1, wherein the crystallization is performed under a pressure of $1\times10^{-2}$ to $1\times10^{-3}$ ton at 1,300-1,600° C.

9. A method for manufacturing a filter, the method comprising the steps of:
   mixing silica with carbon to form a mixture;
   pressing the mixture to form a porous support, the porous support having a porosity of 30-70% and a pore size of 1-10 μm;
   positioning the porous support on or under a filter base; and
   crystallizing the resulting structure under an inert atmosphere to grow silicon carbide nanowires, the silicon carbide nanowires having a diameter of 20 to 50 nm and a length of 5 to 100 μm.

* * * * *